(12) United States Patent
Aceves

(10) Patent No.: US 9,267,301 B2
(45) Date of Patent: Feb. 23, 2016

(54) UNDERWATER WILDLIFE CONNECTION SWIMMING POOL

(71) Applicant: Samuel Aceves, Saint Helena, CA (US)

(72) Inventor: Samuel Aceves, Saint Helena, CA (US)

( * ) Notice: Subject to any disclaimer, the term of this patent is extended or adjusted under 35 U.S.C. 154(b) by 97 days.

(21) Appl. No.: 14/172,070

(22) Filed: Feb. 4, 2014

(65) Prior Publication Data

US 2015/0218834 A1 Aug. 6, 2015

(51) Int. Cl.
*E04H 4/14* (2006.01)
*E04H 4/12* (2006.01)
*A01K 63/00* (2006.01)

(52) U.S. Cl.
CPC *E04H 4/14* (2013.01); *A01K 63/00* (2013.01); *E04H 4/1218* (2013.01); *E04H 4/1272* (2013.01); *E04H 4/144* (2013.01); *E04H 4/145* (2013.01)

(58) Field of Classification Search
CPC ............ E04H 3/16; E04H 3/165; A47K 3/16; A47K 3/17; A47K 3/162
USPC ...................... 4/489, 555, 584, 506, 592, 594; 119/245–251; 52/250, 294, 295, 296
See application file for complete search history.

(56) References Cited

U.S. PATENT DOCUMENTS

| | | | | |
|---|---|---|---|---|
| 264,047 A * | 9/1882 | Stoner | | 248/405 |
| 324,508 A * | 8/1885 | Wenmaekers | | E04H 3/10 119/247 |
| 746,390 A * | 12/1903 | Schmidt | | A47K 3/006 374/141 |
| 3,222,030 A * | 12/1965 | Thorpe | | E04F 15/02452 248/354.3 |
| 3,641,593 A * | 2/1972 | Goettl | | 52/169.7 |
| 3,831,329 A * | 8/1974 | Lear | | E04F 15/02458 248/354.3 |
| 4,240,165 A * | 12/1980 | Kyrias | | E04H 4/129 4/493 |
| 4,290,154 A * | 9/1981 | Benjamin | | 4/538 |
| 4,364,132 A * | 12/1982 | Robinson | | 4/546 |
| D270,936 S * | 10/1983 | Everson | | D23/271 |
| 4,535,489 A * | 8/1985 | Elkins | | 4/546 |
| 4,551,869 A * | 11/1985 | Whitney | | A47K 3/17 4/589 |
| 4,854,256 A * | 8/1989 | Hayashi | | 114/61.1 |
| 4,905,326 A * | 3/1990 | Nakamura et al. | | 4/488 |
| 5,009,188 A * | 4/1991 | Yasui | | 119/253 |
| 5,459,888 A * | 10/1995 | Chen | | A47K 3/16 4/593 |
| 5,537,696 A | 7/1996 | Chartier | | |
| 5,960,489 A * | 10/1999 | Hanel et al. | | 4/538 |
| 6,595,675 B2 | 7/2003 | Dongo | | |
| 6,796,776 B2 * | 9/2004 | Jolley et al. | | 417/313 |
| 8,011,032 B2 * | 9/2011 | Cline et al. | | 4/509 |
| 2002/0020010 A1 * | 2/2002 | Mizutani | | 4/487 |
| 2010/0146695 A1 * | 6/2010 | Hoan Tuan et al. | | 4/506 |
| 2013/0180042 A1 * | 7/2013 | Guridi | | 4/506 |
| 2014/0026312 A1 * | 1/2014 | Lignini | | 4/506 |

* cited by examiner

*Primary Examiner* — Lauren Crane
*Assistant Examiner* — Erin Deery
(74) *Attorney, Agent, or Firm* — Plager Schack LLP

(57) ABSTRACT

An underwater wildlife connection swimming pool is configured to engage human users with aquatic wildlife. The underwater wildlife connection swimming pool includes a swimming pool that is configured to accommodate swimming pool water with chemicals and temperatures used in recreational swimming. The swimming pool further comprises entirely transparent walls attached to an entirely transparent floor. A swimming pool deck is mechanically coupled to the swimming pool. An aquatic wildlife tank is attached to the swimming pool deck. The aquatic wildlife tank has an aquatic wildlife tank floor. The aquatic wildlife tank is configured to accommodate aquatic wildlife tank water with temperature and salinity safe for the aquatic wildlife. A plurality of swimming pool inserts are mechanically coupled to the entirely transparent floor. A plurality of support columns are mechanically coupled to the plurality of swimming pool inserts and the aquatic wildlife tank floor.

4 Claims, 4 Drawing Sheets

UNDERWATER WILDLIFE CONNECTION SWIMMING POOL

BACKGROUND

The embodiments herein relate generally to devices the permit engagement of a user and aquatic wildlife.

Prior to embodiments of the disclosed invention, there was no way to arrange clear swimming pool within a second swimming pool to support aquatic wildlife and humans with some degree of physical separation with no visual separation. The prior art includes U.S. Pat. No. 5,537,696 issued to Chartier; U.S. Patent Application 2013/0180042 filed by Guridi; and U.S. Pat. No. 6,595,675 issued to Dongo.

Chartier teaches an apparatus that produces a sheet waterfall for a swimming pool or spa, but does not teach multiple levels in the swimming pool or spa. Guridi teaches a wildlife discovery swimming pool but only a small portion of the bottom surface is transparent. Dongo teaches fiberoptic illumination for a swimming pool waterfall unit. Embodiments of the disclosed invention improve on these technologies as indicated below.

SUMMARY

An underwater wildlife connection swimming pool is configured to engage human users with aquatic wildlife. The underwater wildlife connection swimming pool includes a swimming pool that is configured to accommodate swimming pool water with chemicals and temperatures used in recreational swimming. The swimming pool further comprises entirely transparent walls attached to an entirely transparent floor. A swimming pool deck is mechanically coupled to the swimming pool. An aquatic wildlife tank is attached to the swimming pool deck. The aquatic wildlife tank has an aquatic wildlife tank floor. The aquatic wildlife tank is configured to accommodate aquatic wildlife tank water with temperature and salinity safe for the aquatic wildlife. A plurality of swimming pool inserts are mechanically coupled to the entirely transparent floor. A plurality of support columns are mechanically coupled to the plurality of swimming pool inserts and the aquatic wildlife tank floor.

In some embodiments, each swimming pool insert can further comprise swimming pool insert threads. Each support column can further comprise an aquatic wildlife tank post slip nut. The swimming pool insert can be mechanically coupled the support column by mating the swimming pool insert threads with the aquatic wildlife tank post slip nut. In some embodiments, the swimming pool deck is mechanically coupled to the swimming pool with a plurality of swimming pool braces.

In some embodiments, an aquatic wildlife tank skimmer can be mechanically coupled to the aquatic wildlife tank. An aquatic wildlife tank skimmer outflow pipe can be mechanically coupled to the aquatic wildlife tank skimmer. An aquatic wildlife tank pump and motor can be mechanically coupled to the aquatic wildlife tank skimmer outflow pipe. An aquatic wildlife tank water filter can be attached to the aquatic wildlife tank pump and motor. An aquatic wildlife tank heat exchanger can be attached to the aquatic wildlife tank water filter. An aquatic wildlife tank skimmer inflow pipe can be attached to the aquatic wildlife tank heat exchanger; wherein the aquatic wildlife tank skimmer inflow pipe is connected to the aquatic wildlife tank. The aquatic wildlife tank water can be pumped from the aquatic wildlife tank through the aquatic wildlife tank skimmer into the aquatic wildlife tank skimmer outflow pipe with the aquatic wildlife tank pump and motor. The aquatic wildlife tank water can be pumped through the aquatic wildlife tank water filter and the aquatic wildlife tank heat exchanger being pumped through the aquatic wildlife tank skimmer inflow pipe which flows into the aquatic wildlife tank.

In some embodiments, a swimming pool skimmer can be mechanically coupled to the swimming pool. A swimming pool skimmer outflow pipe can be mechanically coupled to the swimming pool skimmer. A swimming pool pump and motor can be mechanically coupled to the swimming pool skimmer outflow pipe. A swimming pool water filter can be attached to the swimming pool pump and motor. A swimming pool heat exchanger can be attached to the swimming pool water filter. A swimming pool skimmer inflow pipe can be attached to the swimming pool heat exchanger. The swimming pool skimmer inflow pipe can be connected to the swimming pool. The swimming pool water can be pumped from the swimming pool through the swimming pool skimmer into the swimming pool skimmer outflow pipe with the swimming pool pump and motor. The swimming pool water can be pumped through the swimming pool water filter and the swimming pool heat exchanger being pumped through the swimming pool skimmer inflow pipe which flows into the swimming pool.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
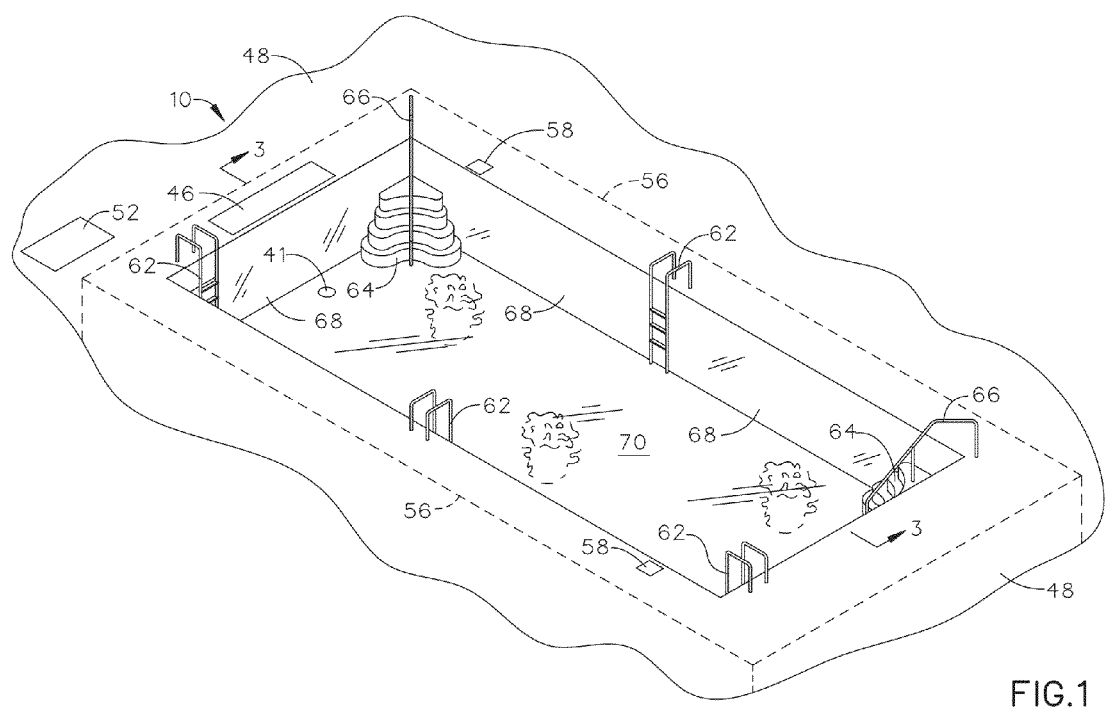
FIG. 1 is a perspective view of an embodiment of the invention.
Figure 2:
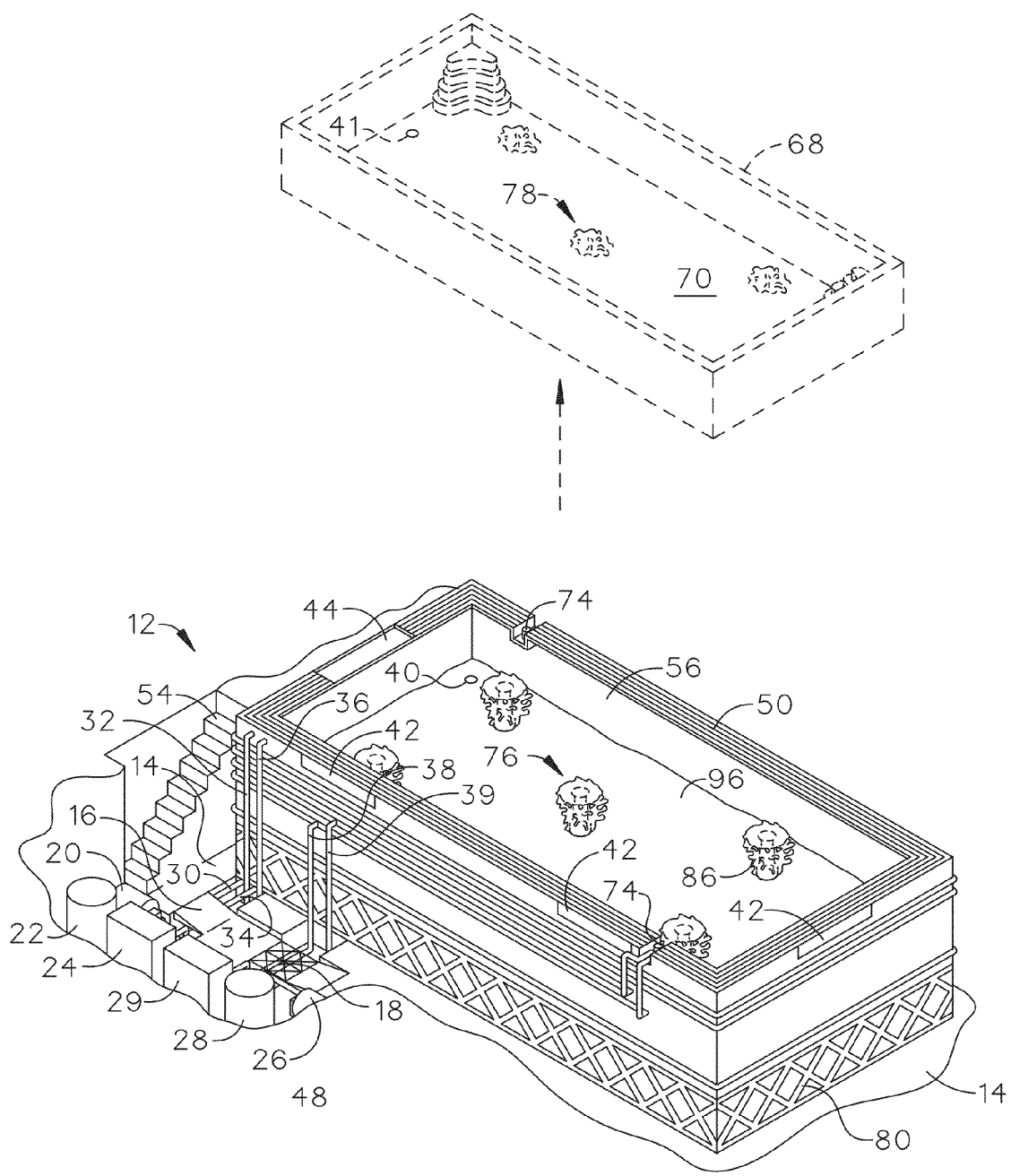
FIG. 2 is a perspective view of an embodiment of the invention, with the below ground elements isolated for clarity.

By way of example, an embodiment of the present invention is a swimming pool joined with an aquatic wildlife tank to form an underwater wildlife connection swimming pool. Referring to FIG. 1, main level 10 comprises swimming pool deck 48. Swimming pool deck 48 comprises ground access door 52 which can be used to access underground level 12 as shown in FIG. 2. The swimming pool comprises entirely transparent walls 68 mechanically coupled to entirely transparent floor 70. Entirely transparent floor 70 further comprises swimming pool drain 41. The swimming pool is filled with water which passes through skimmers that can be accessed through skimmer access panels 58. A user can access the swimming pool from swimming pool deck 48 from either swimming pool steps 64 with hand rail 66 or ladder 62. The swimming pool is entirely surrounded by aquatic wildlife tank 56 which is shown in more detail in FIG. 2.

FIG. 2 shows lower level 12. Lower level 12 can be accessed from upper level 10 by stairs 54. Stairs 54 is mechanically coupled to maintenance walkway 14. Maintenance walkway 14 can be used to access swimming pool pump and motor 20, swimming pool water filter 22, swimming pool heat exchanger 24, aquatic wildlife tank pump and motor 26, aquatic wildlife tank water filter 28 and aquatic wildlife tank heat exchanger 29. In some embodiments, hinged ramp 16 and hinged grate 18 can be used to inspect or perform maintenance on any of these components.

Aquatic wildlife tank 56 comprises walls mechanically coupled to aquatic wildlife tank floor 96. Aquatic wildlife tank floor 96 is perforated with aquatic wildlife tank drain 40. Aquatic wildlife tank 56 can be accessed by large aquatic wildlife tank opening 44 and aquatic wildlife tank doors 42. Aquatic wildlife tank 56 is lit with aquatic wildlife tank lighting 50.

Aquatic wildlife tank 56 is mechanically coupled to aquatic wildlife tank skimmer 74. Aquatic wildlife tank skimmer 74 is mechanically coupled to aquatic wildlife tank skimmer outflow pipe 39. Aquatic wildlife tank skimmer outflow pipe 39 is mechanically coupled to aquatic wildlife tank pump and motor 26. Aquatic wildlife tank water is pumped from aquatic wildlife tank 56 through aquatic wildlife tank skimmer 74 into aquatic wildlife tank skimmer outflow pipe 39 with aquatic wildlife tank pump and motor 26. From there, the water is pumped through aquatic wildlife tank water filter 28 and aquatic wildlife tank heat exchanger 29 before being pumped through aquatic wildlife tank skimmer inflow pipe 38 which flows into aquatic wildlife tank 56.

Where processing water is not desired (for instance initial aquatic wildlife tank 56 filling), water can be pumped into aquatic wildlife tank 56 through aquatic wildlife tank inflow pipe 32. Likewise aquatic wildlife tank 56 can be drained through aquatic wildlife tank drain pipe 30 which is mechanically coupled to aquatic wildlife tank drain 40. To facilitate draining, aquatic wildlife tank 56 can be elevated with aquatic wildlife tank stand 80 as needed.

Figure 3:
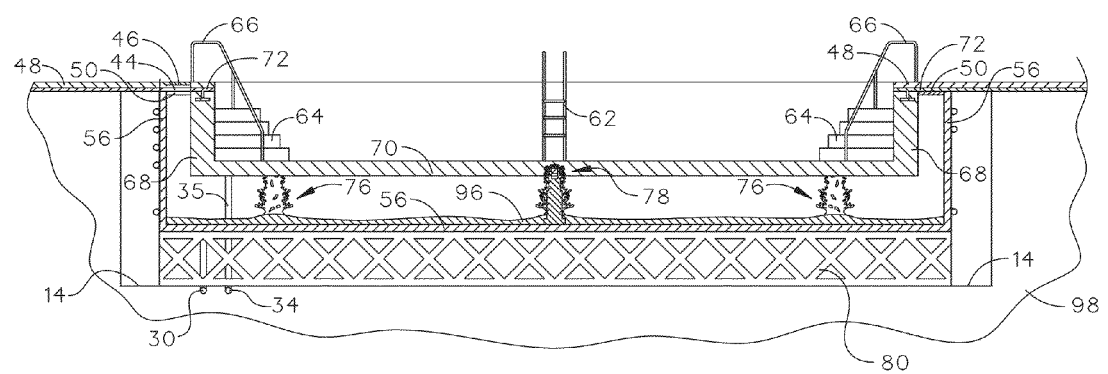
FIG. 3 is a section view of an embodiment of the invention, taken along line 3-3 in FIG. 1.

In a similar manner, entirely transparent floor 70 is perforated with swimming pool drain 41 which is mechanically coupled to swimming pool drain pipe 34, having a transparent portion 35 as shown in FIG. 3.

The swimming pool is mechanically coupled to swimming pool skimmer 74. Swimming pool skimmer 74 is mechanically coupled to swimming pool skimmer outflow pipe 32. Swimming pool skimmer outflow pipe 32 is mechanically coupled to swimming pool aquatic wildlife tank pump and motor 20. Swimming pool water is pumped from the swimming pool through swimming pool skimmer 74 into swimming pool skimmer outflow pipe 32 with swimming pool pump and motor 26. From there, the swimming pool water is pumped through swimming pool water filter 22 and swimming pool heat exchanger 24 before being pumped through swimming pool skimmer inflow pipe 36 which flows into the swimming pool.

As used in this application a "heat exchanger" means any device configured to warm or cool water to a desired temperature. In this case the desired temperatures can be for human users swimming in a swimming pool in one instance and aquatic wild life swimming in aquatic wild life tank 56 in another instance. These temperatures can vary greatly, through the ability of the present invention to regulate water temperature in each section.

Turning to FIG. 3, entirely transparent walls 68 and entirely transparent floor 70 are surrounded by aquatic wildlife tank 56. Aquatic wildlife tank 56 can be accessed through swimming pool deck 48 by opening aquatic wildlife tank opening cover 46 and entering through aquatic wildlife tank opening 44. A user who enters the swimming pool will be able to see through entirely transparent walls 68 and entirely transparent floor 70 into aquatic wildlife tank 56. In an improvement over Guridi, the entirely transparent floor 70 is transparent, rather than just parts of it. There are two ways this is possible. First, swimming pool deck 48 is mechanically coupled to the swimming pool with a plurality of swimming pool braces 72. Second, vibration of the swimming pool is substantially reduced by a plurality of swimming pool inserts 78 into a plurality of support columns 76 which mechanically coupled entirely transparent floor 70 to aquatic wildlife tank floor 96. In the current arrangement of an in ground swimming pool, ground 98 is shown as reference.

Figures 4, 5:
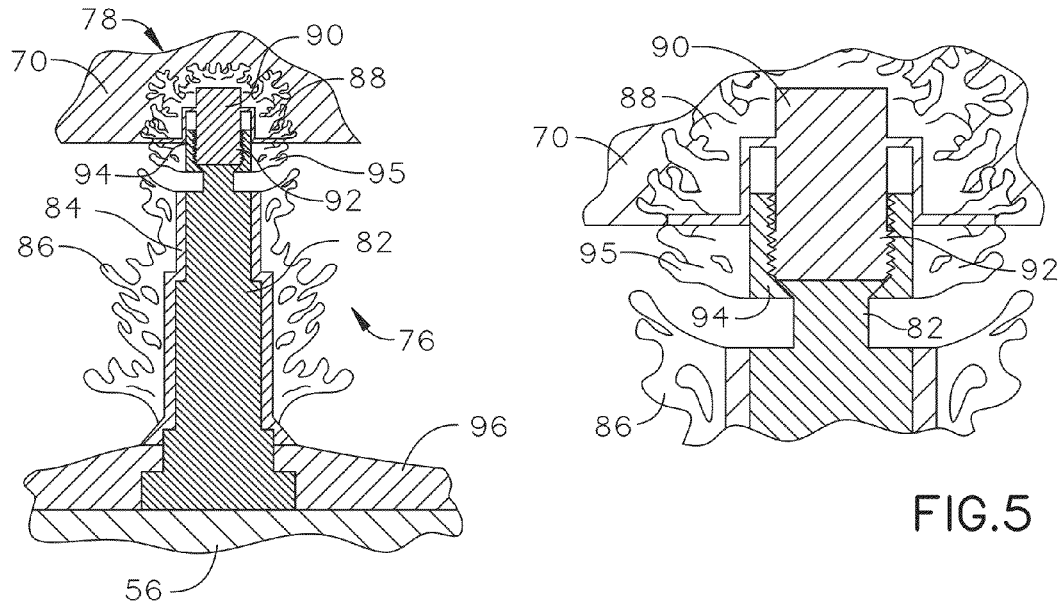
FIG. 4 is a detail section view of an embodiment of the invention.
FIG. 5 is a detail section view of an embodiment of the invention.
Figure 6:
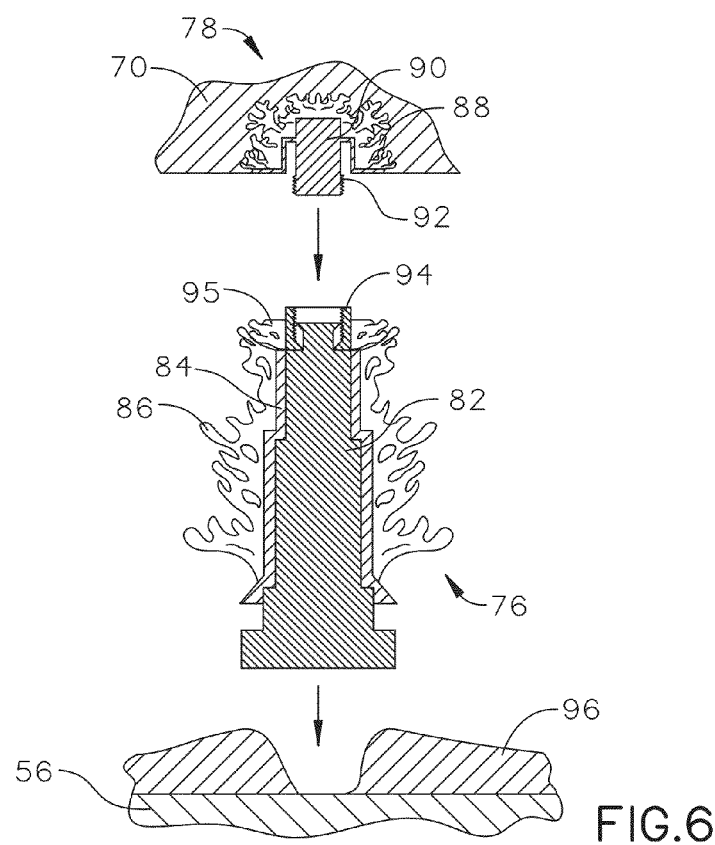
FIG. 6 is a detail section view of an embodiment of the invention, illustrating the fitting and placement of the support columns.

FIG. 4, FIG. 5 and FIG. 6, show this relationship in more detail. Swimming pool insert 78 comprises swimming pool insert post 90 mechanically coupled to entirely transparent floor 70. Swimming pool insert post further comprises swimming pool insert threads 92 and is covered by swimming pool coral 88.

Support column 76 comprises inner aquatic wildlife tank column 82 mechanically coupled to outer aquatic wildlife tank column 85. Inner aquatic wildlife tank column 82 is mechanically coupled to aquatic wildlife tank floor 96. Inner aquatic wildlife tank column 82 is mechanically coupled to aquatic wildlife tank post slip nut 94 which is configured to accommodate swimming pool insert threads 92. As a result of mating the threads swimming pool floor 70 will become immediately adjacent to slip nut coral 95 creating a water proof seal between the swimming pool and aquatic wildlife tank 56. Outer aquatic wildlife tank column 85 is further covered with column coral 86.

Fundamentally, embodiments of the present invention make the swimming pool habitable for humans and capable of handling the chemicals necessary for humans to be clean and safe within the swimming pool at a temperature pleasing for humans. Aquatic wild life can live within aquatic wildlife tank 56 which is configured to house aquatic wild life at a temperature and salinity necessary for the aquatic wild life to be safe. It is noteworthy that the aquatic wildlife tank water is completely segregated from the swimming pool water. This enables human users to swim comfortably with fish, and potentially dangerous predators while being completely and safely segregated from the dangerous predators.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. An underwater wildlife connection swimming pool configured to engage human users with aquatic wildlife; the underwater wildlife connection swimming pool, comprising:
  a swimming pool, configured to accommodate swimming pool water with chemicals and temperatures used in recreational swimming; wherein the swimming pool further comprises entirely transparent walls mechanically coupled to an entirely transparent floor;
  an aquatic wildlife tank attached to the swimming pool; wherein the aquatic wildlife tank further comprises an aquatic wildlife tank floor; wherein the aquatic wildlife tank is configured to accommodate aquatic wildlife tank water with temperature and salinity safe for the aquatic wildlife;
  a swimming pool drain, arranged within the entirely transparent floor and attached to a swimming pool drain pipe that travels through the aquatic wildlife tank; wherein the portion of the drain pipe within the aquatic wildlife tank is transparent;

an aquatic wildlife tank stand, attached to the aquatic wildlife tank and configured to elevate the aquatic wildlife tank from a ground surface;

a swimming pool insert, further comprising a swimming pool insert a post having swimming pool insert threads surrounded by a recess into the entirely transparent floor;

a support column, further comprising an inner aquatic wildlife tank column attached to an outer aquatic wildlife tank column; wherein the outer aquatic wildlife tank column is attached to the aquatic wildlife tank floor;

an aquatic wildlife tank post slip nut attached to the an inner aquatic wildlife tank column which is further attached to the swimming pool insert threads and into the recess an aquatic wildlife tank water filter attached to an aquatic wildlife tank pump and motor;

an aquatic wildlife tank heat exchanger attached to the aquatic wildlife tank water filter;

wherein the aquatic wildlife tank water is pumped through the aquatic wildlife tank water filter and the aquatic wildlife tank heat exchanger and is pumped through the aquatic wildlife tank skimmer inflow pipe which flows into the aquatic wildlife tank.

2. The underwater wildlife connection swimming pool of claim 1, further including a plurality of support columns mechanically coupled to a plurality of swimming pool inserts and the aquatic wildlife tank floor.

3. The underwater wildlife connection swimming pool of claim 1, wherein a swimming pool deck is mechanically coupled to the swimming pool with a plurality of swimming pool braces.

4. The underwater wildlife connection swimming pool of claim 1, further comprising a swimming pool skimmer mechanically coupled to the swimming pool;

a swimming pool skimmer outflow pipe mechanically coupled to the swimming pool skimmer;

a swimming pool pump and motor mechanically coupled to the swimming pool skimmer outflow pipe;

a swimming pool water filter attached to the swimming pool pump and motor;

a swimming pool heat exchanger attached to the swimming pool water filter;

a swimming pool skimmer inflow pipe attached to the swimming pool heat exchanger;

wherein the swimming pool skimmer inflow pipe is connected to the swimming pool;

wherein the swimming pool water is pumped from the swimming pool through the swimming pool skimmer into the swimming pool skimmer outflow pipe with the swimming pool pump and motor;

wherein the swimming pool water is pumped through the swimming pool water filter and the swimming pool heat exchanger and is pumped through the swimming pool skimmer inflow pipe which flows into the swimming pool.

* * * * *